United States Patent
Tasi (10) Patent No.: US 10,502,248 B2
(45) Date of Patent: Dec. 10, 2019

(54) FIXING FRAME

(71) Applicant: Chih-Hsin Tasi, Taichung (TW)

(72) Inventor: Chih-Hsin Tasi, Taichung (TW)

(*) Notice: Subject to any disclaimer, the term of this patent is extended or adjusted under 35 U.S.C. 154(b) by 220 days.

(21) Appl. No.: 15/510,233

(22) PCT Filed: Apr. 5, 2016

(86) PCT No.: PCT/CN2016/078445
§ 371 (c)(1),
(2) Date: Mar. 9, 2017

(87) PCT Pub. No.: WO2016/161926
PCT Pub. Date: Oct. 13, 2016

(65) Prior Publication Data
US 2017/0284431 A1    Oct. 5, 2017

(30) Foreign Application Priority Data

Apr. 8, 2015 (CN) .......................... 2015 1 0162707

(51) Int. Cl.
*F16B 2/08* (2006.01)

(52) U.S. Cl.
CPC ..................................... *F16B 2/08* (2013.01)

(58) Field of Classification Search
CPC .... F16B 2/08; H04M 1/04; A43C 7/08; A43C 7/00; A43C 9/08; A43C 11/165; A43C 11/16; F16G 11/12; Y10T 24/2183; Y10T 24/2187; Y10T 24/3724; B65H 54/00
See application file for complete search history.

(56) References Cited

U.S. PATENT DOCUMENTS

| | | | |
|---|---|---|---|
| 6,267,390 B1* | 7/2001 | Maravetz | A43B 5/0401 280/14.21 |
| 6,708,376 B1* | 3/2004 | Landry | A42B 3/145 2/418 |
| 7,950,112 B2* | 5/2011 | Hammerslag | A43B 5/16 24/68 SK |
| 8,695,577 B2* | 4/2014 | LoRocco | A41D 13/088 124/35.2 |
| 2003/0066856 A1 | 4/2003 | Lehtonen | |

(Continued)

FOREIGN PATENT DOCUMENTS

| | | |
|---|---|---|
| CN | 201465448 U | 5/2010 |
| CN | 202075823 U | 12/2011 |

(Continued)

*Primary Examiner* — Robert Sandy
*Assistant Examiner* — Rowland Do
(74) *Attorney, Agent, or Firm* — CKC & Partners Co., Ltd.

(57) ABSTRACT

A fixing frame which is for clamping an article includes a frame body, a lace and a rotatable fastening device. The frame body is detachably positioned on at least two sides of the article and released or retracted between a securing position and a releasing position. The article is allowed to be released when the frame body is at the releasing position, and the article is firmly connected to the frame body when the frame body is at the securing position. The lace is limitedly threaded on the frame body. The rotatable fastening device is coupled to the lace. The frame body is retracted from the releasing position to the securing position by rotating the rotatable fastening device along a fastening direction, and the frame body is released from the securing position to the releasing position by rotating the rotatable fastening device to loosen the lace.

16 Claims, 9 Drawing Sheets

(56) References Cited

U.S. PATENT DOCUMENTS

| | | | |
|---|---|---|---|
| 2007/0128959 A1* | 6/2007 | Cooke | B63C 9/08 441/108 |
| 2008/0060167 A1* | 3/2008 | Hammerslag | A43B 5/16 24/68 SK |
| 2008/0066272 A1* | 3/2008 | Hammerslag | A43C 11/14 24/712 |
| 2011/0197362 A1* | 8/2011 | Chella | A61F 5/0111 5/650 |
| 2012/0037783 A1 | 2/2012 | Alexander et al. | |
| 2014/0003021 A1* | 1/2014 | Bury | F16M 13/00 361/807 |
| 2015/0151070 A1* | 6/2015 | Capra | A61M 16/0644 128/207.11 |
| 2016/0014243 A1* | 1/2016 | Snowden | B60R 11/0241 455/575.1 |

FOREIGN PATENT DOCUMENTS

| | | |
|---|---|---|
| CN | 202551576 U | 11/2012 |
| CN | 202935278 U | 5/2013 |
| CN | 203708301 U | 7/2014 |
| DE | 102011053607 A1 | 3/2013 |
| DE | 102011054346 B3 | 4/2013 |
| JP | 3034230 U | 2/1997 |
| JP | 2001178524 A | 7/2001 |
| JP | 2012191179 A | 10/2012 |
| JP | 2013154147 A | 8/2013 |
| JP | 2013192085 A | 9/2013 |
| KR | 101502272 B1 | 3/2015 |
| TW | 201238348 A | 9/2012 |
| TW | 201405279 A | 2/2014 |
| TW | M479374 U | 6/2014 |

\* cited by examiner

FIXING FRAME

CROSS-REFERENCE TO RELATED APPLICATION

This application is a continuation of International application No. PCT/CN2016/078445, filed Apr. 5, 2016, which claims the benefits of priority of CN application No. 201510162707.7 filed on Apr. 8, 2015, the content of which are incorporated herein by reference.

BACKGROUND

Technical Field

The present disclosure relates to a fixing frame for clamping an article. More particularly, the present disclosure relates to a fixing frame which adapts a rotatable fastening device for winding a lace to secure the article.

Description of Related Art

A fixing device which uses a frame to clamp an article is commonly used in the market. The frame can be used for protecting the article or for connecting to other components. The fixing device can be a protecting case of a cell phone or an auxiliary supporter of the rear mirror. Although the article and the frame is engaged with each other, the article will separate from the frame under huge impact.

In order to connect the article and the frame firmly, a belt or a screw is used to increase the stability of the connection between the article and the frame. Although the method and components can increase the stability of the connection, it is hard to assemble or separate the frame. More steps or specific tools must be used to assemble or separate the frame; hence, the use of the frame is limited.

A strap with staggered tooth is developed to simplify the steps for assembling or separating the frame. Because the distance between the teeth is fixed, the frame cannot tightly connect to the article.

SUMMARY

Therefore, one aspect of the present disclosure is to provide a fixing frame which includes a lace and a rotatable fastening device. The lace is coupled to the rotatable fastening device so as to firmly connect the fixing frame to the article, and the article will not release from the fixing frame due to external impact.

Another aspect of the present disclosure is to provide a fixing frame which can be assembled with the article or separated from the article by simply rotating the rotatable fastening device.

Finally, the other aspect of the present disclosure is to provide a fixing frame, wherein the lace can be steplessly coupled to the rotatable fastening device.

The fixing frame described in the present disclosure can be used as a protecting case (such as cell phone case) or as a supporter for article (such as a rear mirror supporter, a picture supporter or a TV supporter). The article is not limited to a specific product, and the article can be a portable electronic devices (such as a cell phone, a pad, a dashboard camera, or a GPS), a fixing display (such as an LCD or a computer monitor), or a displayed product (such as a painting or a poster).

A fixing frame which is for clamping an article includes a frame body, a lace and a rotatable fastening device. The frame body is detachably positioned on at least two sides of the article and released or retracted between a securing position and a releasing position. The article is allowed to be released when the frame body is at the releasing position, and the article is firmly connected to the frame body when the frame body is at the securing position. The lace is limitedly threaded on the frame body. The rotatable fastening device is coupled to the lace. The frame body is retracted from the releasing position to the securing position by rotating the rotatable fastening device along a fastening direction, and the frame body is released from the securing position to the releasing position by rotating the rotatable fastening device to loosen the lace.

Through the above mentioned embodiment, the lace can be retracted smoothly by rotating the rotatable fastening device, and the frame can be steplessly released or retracted between a securing position and a releasing position. Hence, the frame can be firmly connected to the article so as to prevent the article from releasing from the frame. Furthermore, there is unnecessary for the user to use a specific tool (such as a screw driver) to secure the frame and the article.

In one example, the lace can be fully released or incrementally released by rotating the rotatable fastening device along a releasing direction. The frame is moved to a releasing position to allow the article to be released. Therefore, the frame can be separated from the article easily by rotating the rotatable fastening device. The fastening tension can be adjusted in time if the lace can be incrementally leased.

In one example, the rotatable fastening device can include a releasing mechanism. The lace can be fully released or incrementally released by operating the releasing mechanism. Hence, the frame can be moved to the releasing position quickly to allow the article to be released.

In one example, the lace is detachably coupled to the rotatable fastening device; thus, the broken lace or the broken rotatable fastening device can be changed in time.

A fixing frame which is for clamping an article includes a frame body, a lace and a rotatable fastening device. The frame body is detachably positioned on at least two sides of the article and includes a clasping member. The clasping member is slidably positioned on the frame body, and the clasping member is movable between a securing position and a releasing position. The article is allowed to be released when the clasping member is at the releasing position, and the article is firmly connected to the frame body when the clasping member is at the securing position. The lace is limitedly threaded between the frame body and, the clasping member. The rotatable fastening device is coupled to the lace. The clasping member is moved from the releasing position to the securing position by rotating the rotatable fastening device along a fastening direction.

Through the above mentioned embodiment, the clasping member can be linked by the lace and be released or refracted between a securing position and a releasing position by rotating the rotatable fastening device. Hence, the frame can be firmly and quickly connected to the article, and the assembly of the frame will become easier.

In one example, the frame body includes a rail disposed at the frame body. The shape of the rail corresponds to the clasping member, and the clasping member can be slidably disposed at the rail. Therefore, the gravity center will not shift when the clasping member is moved between the releasing position and the fastening position, and the article will not separate from the frame.

In one example, the frame body includes a plurality of through holes which are for the lace to pass through the frame body. The clasping member includes a guiding passage for the lace to pass through the clasping member. The clasping member is linked by the lace and can be moved between the securing position and the releasing position.

In one example, the lace is detachably coupled to the rotatable fastening device. The lace can be fully or incrementally released by rotating the rotatable fastening device along a releasing direction. The rotatable fastening device includes a releasing mechanism and the lace can be fully or incrementally released by operating the releasing mechanism.

The fixing frame includes the following advantage.

1. When the rotatable fastening device is coordinated with the lace, the frame body and the article can be quickly secured. The frame body can also protect the article.

2. The frame body can be assembled or separated by rotating the rotatable fastening device without using a specific tool.

3. The fastening force and method of the fixing frame can be adjusted in real time according to the shape of the article with the help of the rotatable fastening device.

DETAILED DESCRIPTION

The embodiments of the present disclosure will be described along with the drawings. In order to illustrate clearly, some details will be described below. However, the present disclosure will not be limited to such details. That is, in some embodiment, such details is not necessary. Besides, in order to simply the drawings, some prior components and structures will be illustrated in simple way in the drawings, and the same elements will be marked in the same labels.

Figure 1:
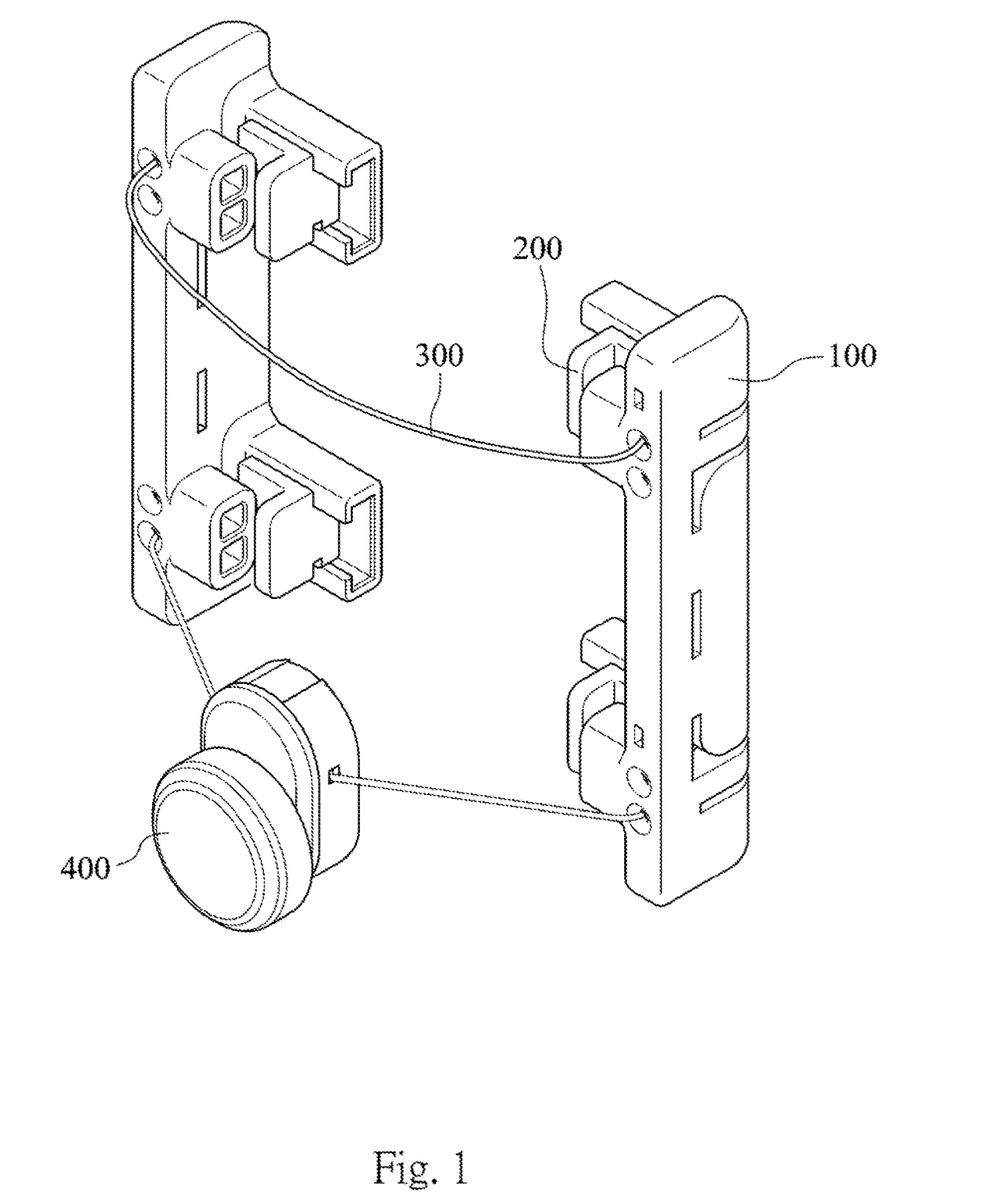
FIG. 1 shows a schematic view of a fixing frame according to one embodiment of the present disclosure.
Figure 2:
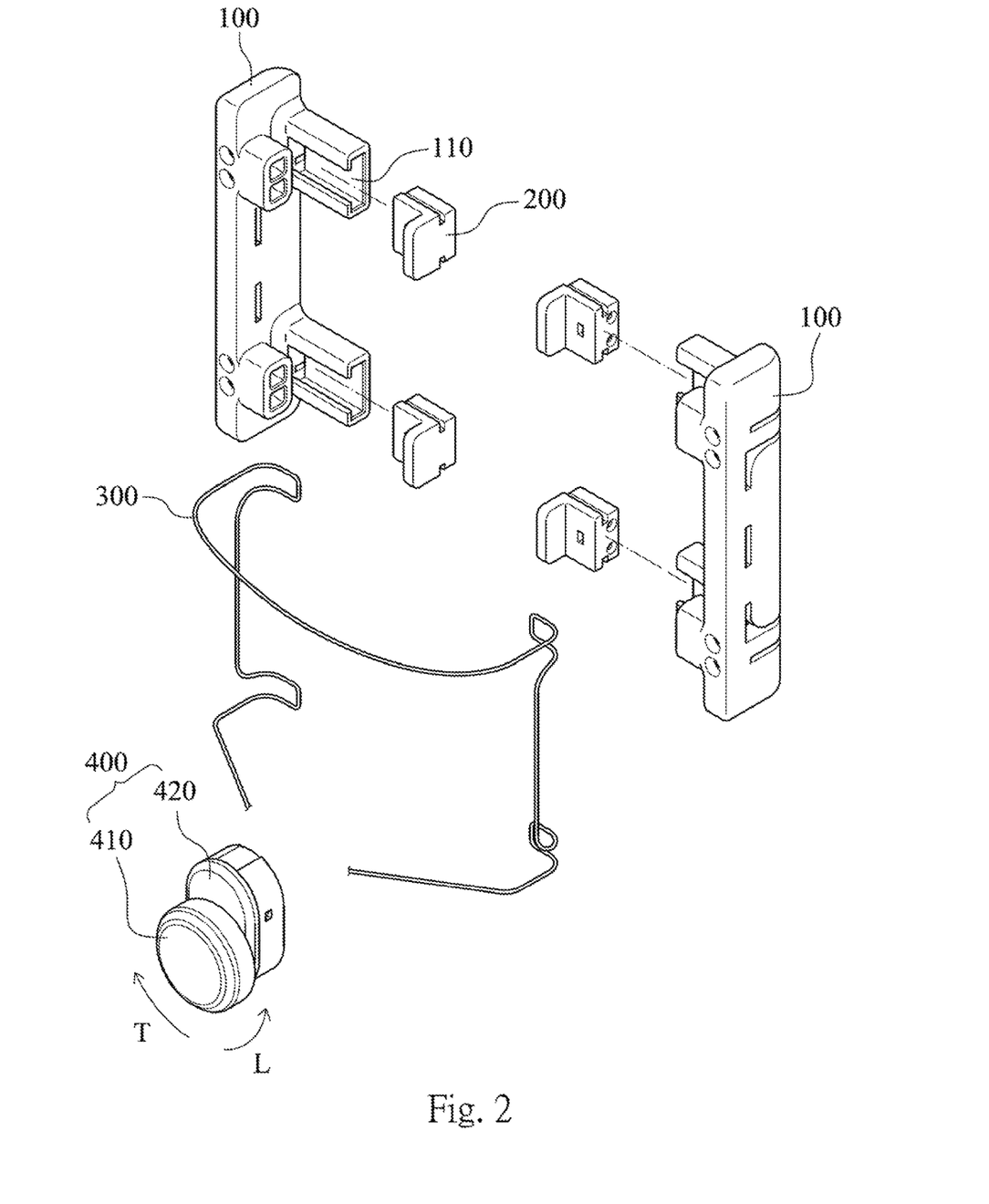
FIG. 2 shows an exploded view of the fixing frame of FIG. 1.
Figure 3:
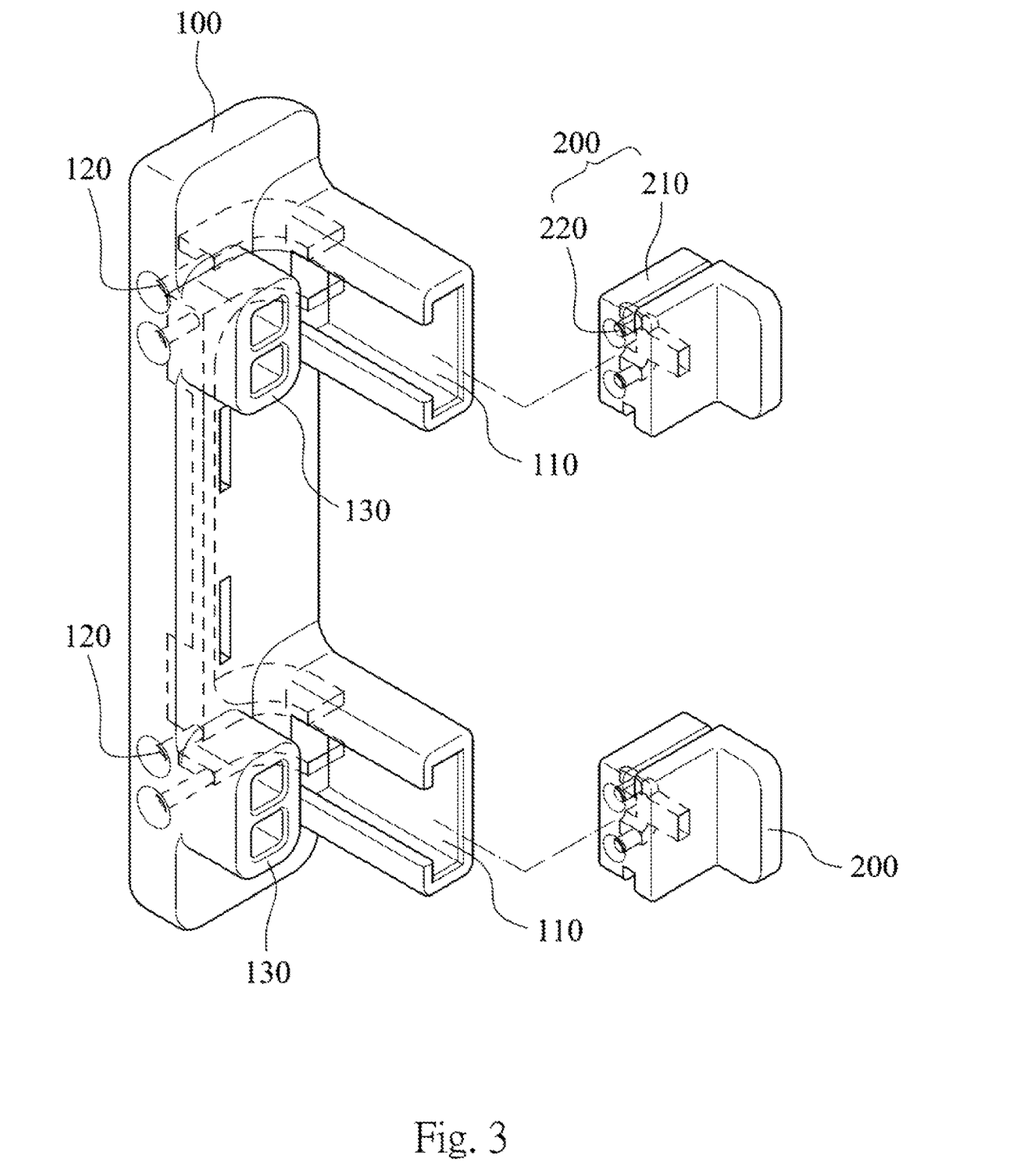
FIG. 3 shows a partial exploded view of the fixing frame of FIG. 1.

Please refer to FIGS. 1 to 3. FIG. 1 shows a schematic view of a fixing frame according to one embodiment of the present disclosure. FIG. 2 shows an exploded view of the fixing frame of FIG. 1. FIG. 3 shows a partial exploded view of the fixing frame of FIG. 1. The fixing frame is for clamping an article. The fixing frame includes a frame body 100, a lace 300 and a rotatable fastening deice 400. The frame body 100 can be U-shaped to be positioned at three sides of the article, or the frame body 100 can be square-shaped to be positioned at four sides of the article; hence, the shape of the frame is not limited thereto. In the embodiment of FIG. 1 the number of the frame bodies 100 is two, and the frame bodies 100 are rods and parallel to each other. But the frame body 100 of the present disclosure should not be limited in rod-shaped and the number of the frame bodies 100 should not be limited in two.

The two frame bodies 100 are detachably disposed at two corresponding sides of the article, respectively. The frame bodies 100 can be released or detracted between a securing position and a releasing position. The article is allowed to be released when the frame bodies 100 are at the releasing position, and the article is firmly connected to the frame bodies 100 when the frame bodies 100 are at the securing position.

The lace 300 is limitedly threaded on the frame bodied 100. The rotatable fastening device 400 is coupled to the lace 300. The frame bodies 100 are retracted from the releasing position to the securing position by rotating the rotatable fastening device 400 along a fastening direction T, and the frame bodies 100 are released from the securing position to the releasing position by rotating the rotatable fastening device 400 to loosen the lace 300.

As shown in FIG. 2, each of the frame bodies 100 includes two rail 110 and two clasping member 200. Each rail 110 corresponds each clasping member 200, and each clasping member 200 is disposed at each rail 110. The clasping member 200 contact the article, and the frame bodies 100 can be moved between the securing position and the releasing position. As shown in FIG. 3, the clasping member 200 includes a sliding end 210, the sliding end 210 is l-shaped such that the clasping member 200 can limitedly slide on the rail 110 without separating.

As shown in FIG. 3, the frame bodies 100 includes a plurality of through holes 120 which allow the lace 300 to pass through. The clasping member 200 includes a guiding passage 220 which allows the lace 300 to pass through the clasping member 200. Therefore, the lace 300 can link with the frame bodies 100 and the clasping member 200 via the through holes 120 and the guiding passage 220.

As shown in FIG. 2, the lace 300 which is passed through the frame bodies 100 and the clasping member 200 is detachably coupled to the rotatable fastening device 400. The rotatable fastening device 400 includes a knob 410 and a housing 420. The lace 300 can be wound into the housing 420 by rotating the knob 410 along the fastening direction T, and the frame bodies 100 will be linked by the lace 300 and be moved from the releasing position to the securing position; consequently, the frame bodies 100 are connected to the article firmly. The housing 420 is for protecting the lace 300 from interfering by the environment. The knob 410 can also be a releasing mechanism. With the operation of the releasing mechanism, including rotating the knob 410 along a releasing direction L or pull up the knob 410 to fully or incrementally release the lace 300, the lace 300 can be loosed. The releasing mechanism can be configured by any kind of components to achieve the releasing function and will not be described.

Figure 4A:
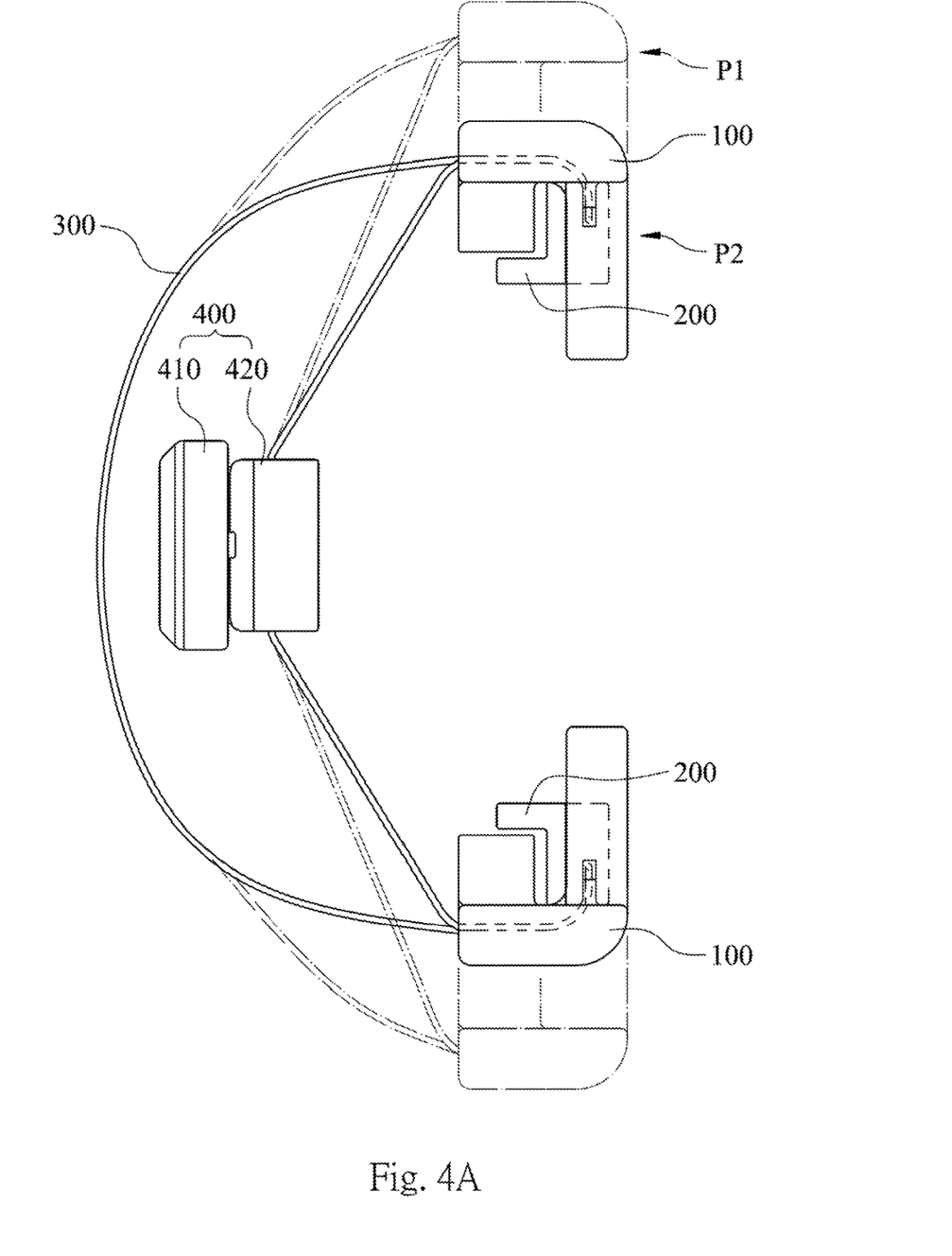
FIG. 4A shows an operating state of the fixing frame of FIG. 1.
Figure 4B:
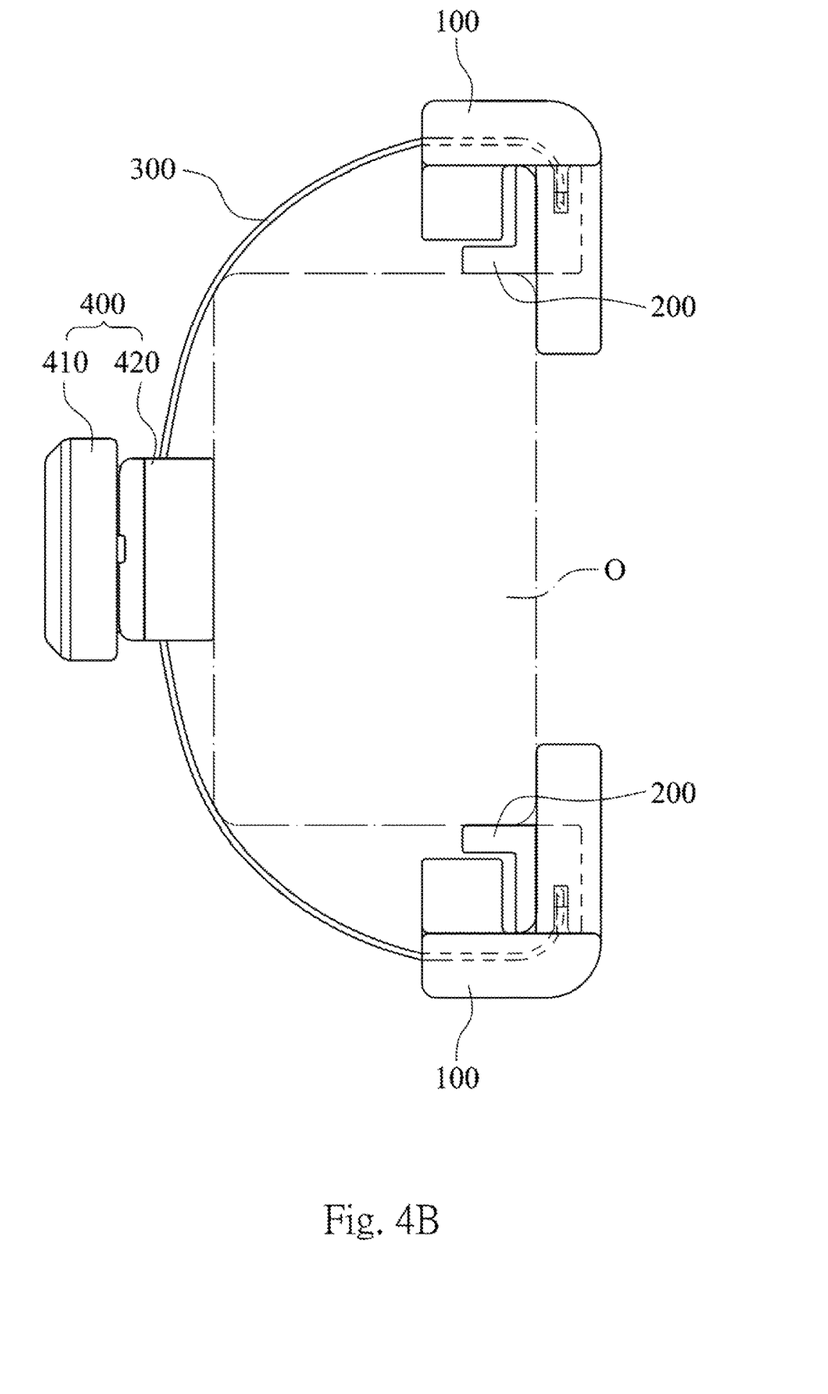
FIG. 4B shows a using state of the fixing frame of FIG. 4A.

Please refer to FIGS. 4A and 4B. FIG. 4A shows an operating state of the fixing frame of FIG. 1. FIG. 4B shows a using state of the fixing frame of FIG. 4A. As shown in FIGS. 4A and 4B, the edge of an article O is unsmooth, and the frame bodies 100 can clamp the article O with the assistance of the clasping member 200. When the rotatable fastening device 400 is rotated along the fastening direction, the frame bodies 100 move from the releasing position P1 to the securing position P2. The article O will be clamped between the two frame bodies 100, and the clasping member 200 is connected to the frame bodies 100 and the article O firmly. The article O can be a cell phone or a pad which includes smooth edges.

Figure 5A:
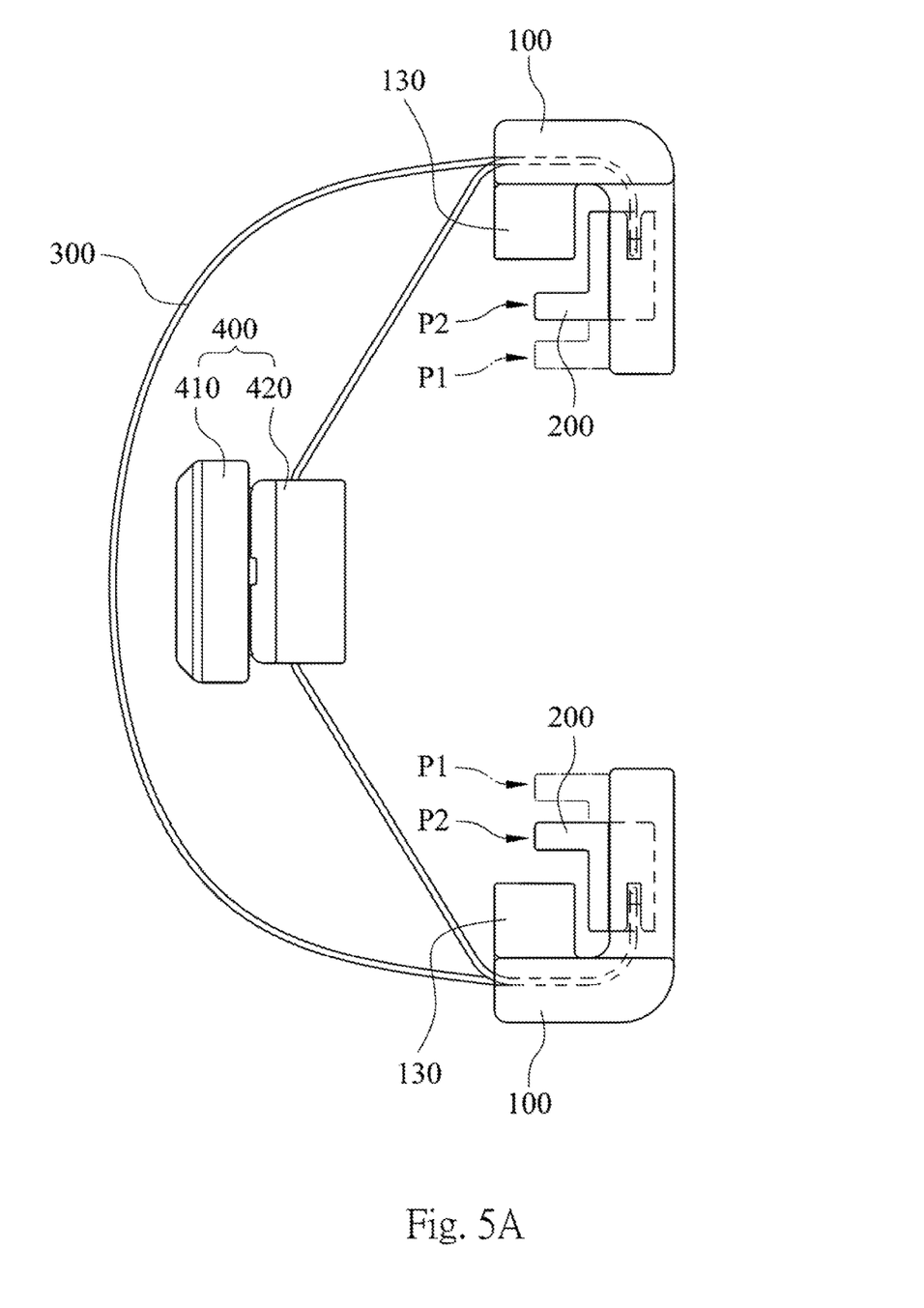
FIG. 5A shows an operating state of a fixing frame according to another embodiment of the present disclosure.
Figure 5B:
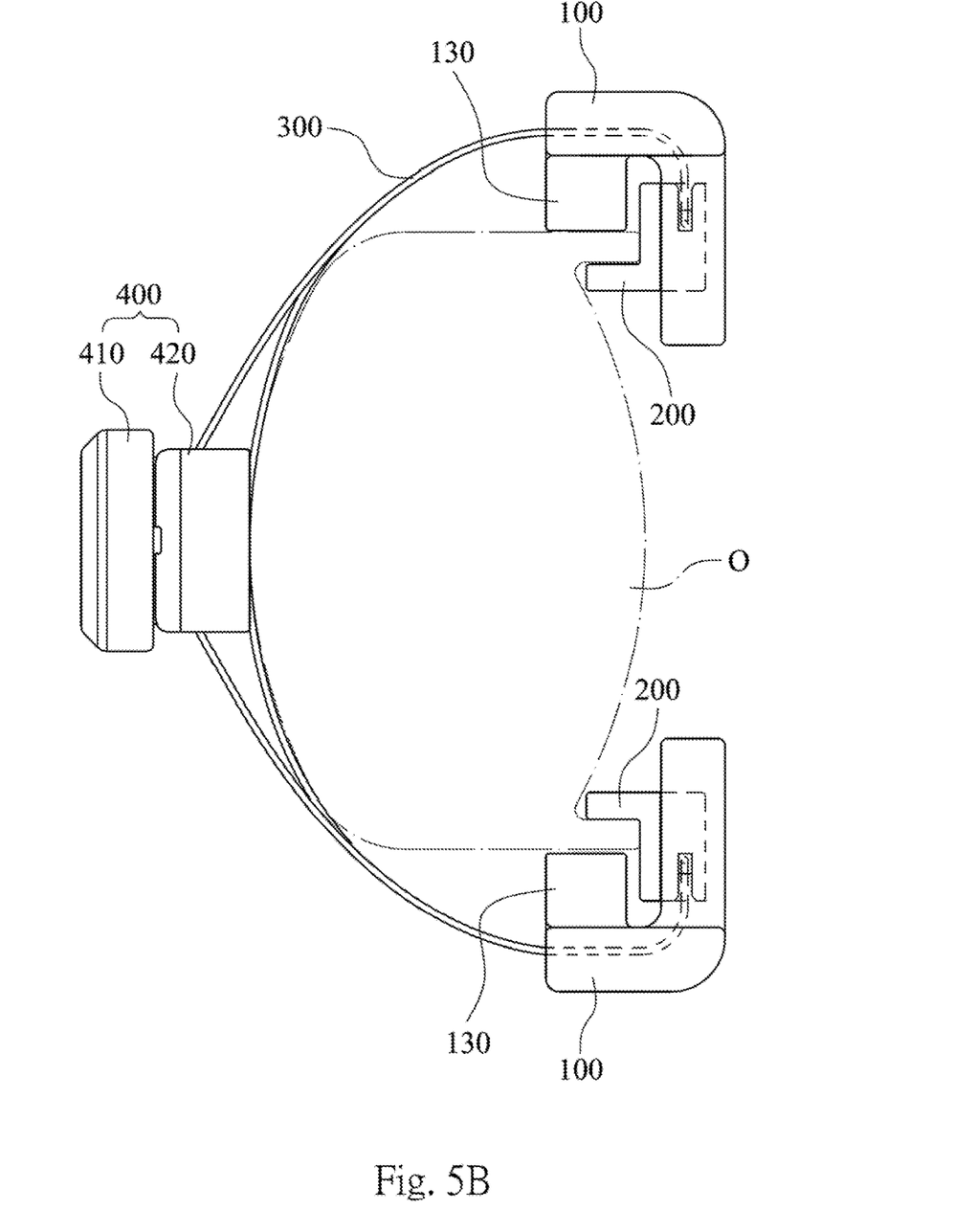
FIG. 5B shows a using state of the fixing frame of FIG. 5A.

Please refer to FIGS. 5A and 5B. FIG. 5A shows an operating state of a fixing frame according to another embodiment of the present disclosure. FIG. 5B shows a using state of the fixing frame of FIG. 5A. The fixing frame includes two frame bodies 100, a lace 300 and a rotatable fastening device 400.

The two frame bodies 100 are detachably disposed at two sides of the article O, and each of the frame bodies 100 includes two clasping member 200. The clasping member 200 is slidably disposed at the frame body 100, and the frame body 100 further includes two abutting members 130. The abutting members 130 correspond to the clasping members 200, respectively. The clasping member 200 can move between a securing position P2 and a releasing position P1. The article O is allowed to be released when the clasping member 200 is at the releasing position, and the article O is firmly clamped by the abutting members 130 and the clasping members 200 when the clasping members 200 are at the securing position.

The lace 300 is limitedly threaded between the clasping member 200 and the frame body 100. The rotatable fastening device 400 is coupled to the lace 300. The frame bodies 100 are retracted from the releasing position P1 to the securing position P2 by rotating the rotatable fastening device 400 along a fastening direction.

The frame body 100 includes two rails and a plurality of through holes. The shape of the rail corresponds to the clasping member 200 such that the clasping member 200 can be slidably disposed at the rail. The lace 300 is passed through the frame body 100 via the through holes. Besides, the clasping member 200 includes a guiding passage to allow the lace 300 to pass through the clasping member 200. Therefore, the clasping member 200 can be linked by the lace 300 and move between the securing position P2 and the releasing position P1 relative to the frame body 100. The relationship of the components are similar to the embodiment described in FIGS. 2 and 3 and will not be described again.

As shown in FIGS. 5A and 5B, the article O includes protruding edges, and the article is secured by the frame body 100 and the clasping member 200 of the fixing frame. When the rotatable fastening device 400 is rotated along the fastening direction, the clasping member 200 will be moved from the releasing position P1 to the securing position P2; thus, the protruding edges of the article O can be clamped between the frame body 100 and the clasping member 200 and the frame body 100 is firmly connected to the article O. The article O can be a picture frame, a side mirror or a rear mirror.

Figure 6:
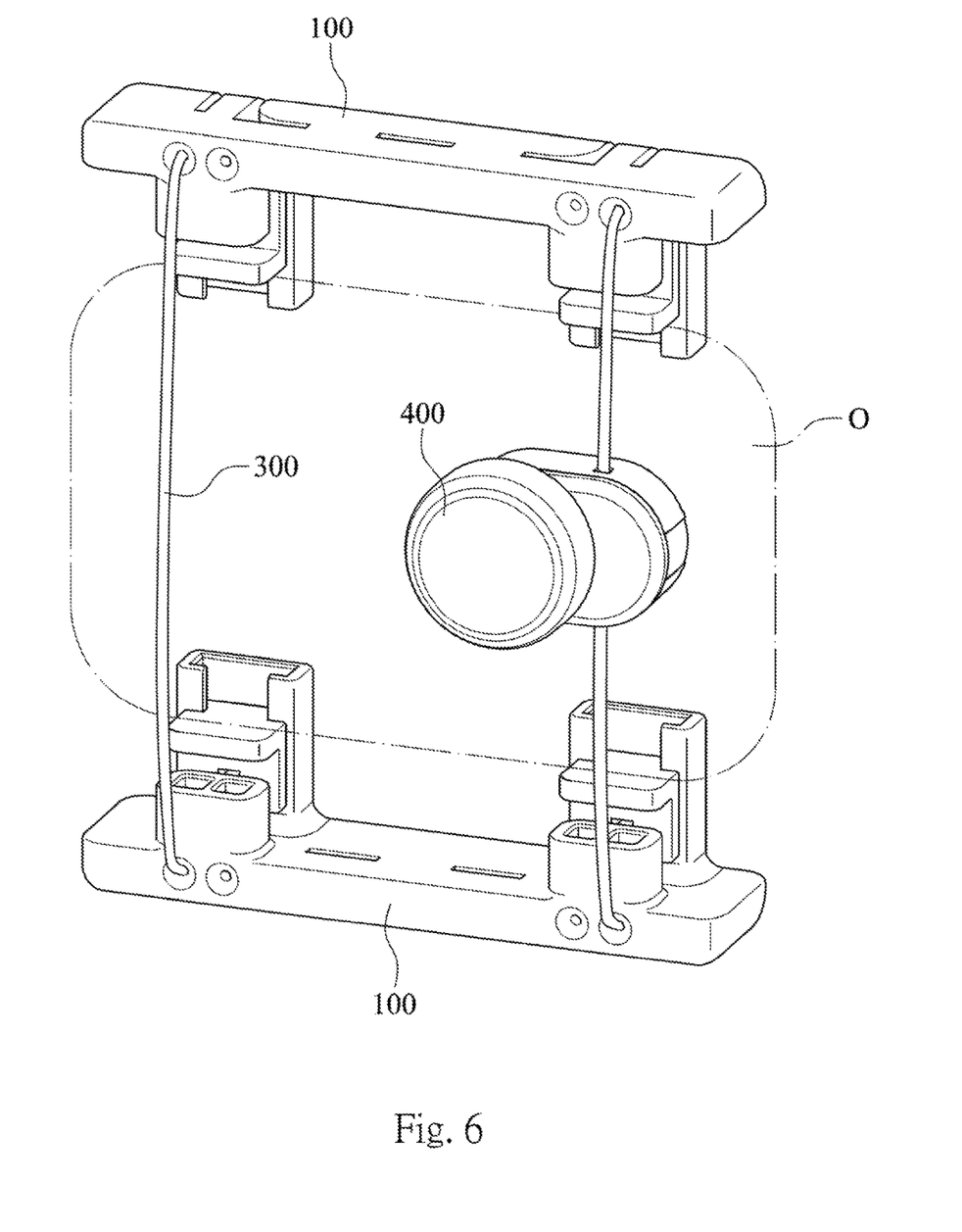
FIG. 6 shows a configuration of a fixture frame according to a further embodiment of the present disclosure.
Figure 7:
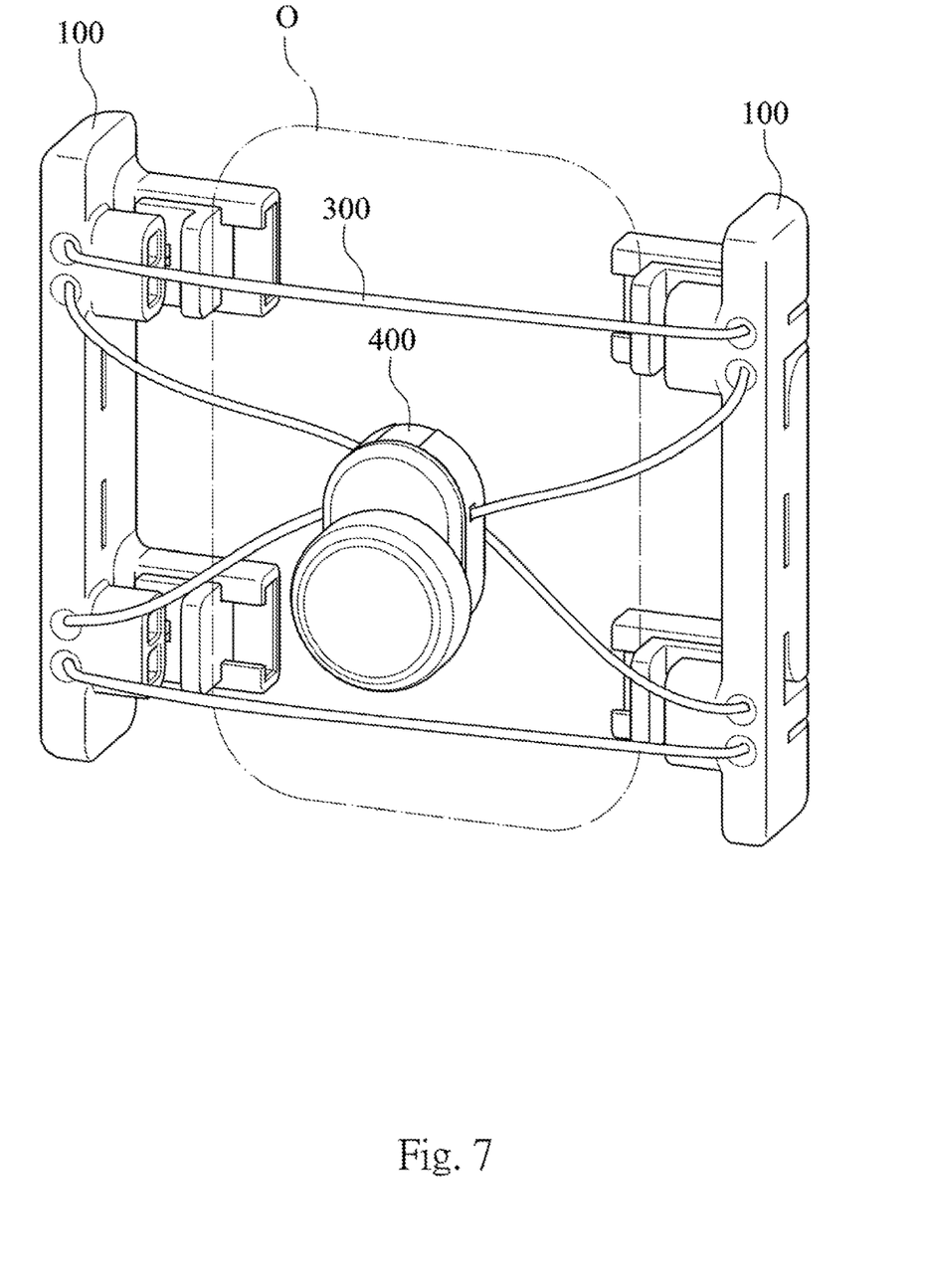
FIG. 7 shows a configuration of a fixture frame according to yet another embodiment of the present disclosure.

Please refer to FIGS. 6 and 7. FIG. 6 shows a configuration of a fixture frame according to a further embodiment of the present disclosure. FIG. 7 shows a configuration of a fixture frame according to yet another embodiment of the present disclosure. As shown in FIG. 6, the lace 300 is threaded in the two frame bodies 100 and four clasping member without cross, and the lace 300 is coupled to the rotatable fastening device 400. When the rotatable fastening device 400 is rotated along the fastening direction, the two frame bodies 100 can quickly clamp two sides of the article O.

As shown in FIG. 7, the lace 300 is threaded into the top side of one of the frame body 100 (first frame body) and the clasping member disposed thereof, and then the lace 300 is threaded into the top side of the other frame body 100 (second frame body) and the clasping member disposed thereof. Similarly, the lace 300 is threaded into the lower side of the first frame body 100 and the clasping member 100 thereof, and then the lace 300 is threaded into the lower side of the second frame body 100. Therefore, when the rotatable fastening device 400 is rotated along the fastening direction, not only the two frame bodies 100 can quickly clamp two sides of the article O, but also the four clasping member can give the article O the same force; hence, the article O will not easily release from the fixing frame due to unbalance load. The fixing frame can include four frame bodies 100 disposed at the four corners of the article, respectively, and the article O can be clamped.

The fixing frame can be an auxiliary supporter which can attach another device or element onto the article. The rotatable fastening device 400 can be disposed at one of the frame bodies 100 to increase the using convenience.

The fixing frame includes the following advantages.

1. When the rotatable fastening device is coordinated with the lace, the frame body and the article can be quickly secured. The frame body can also protect the article.

2. The frame body can be assembled or separated by rotating the rotatable fastening device without using a specific tool.

3. The fastening force and method of the fixing frame can be adjusted in real time according to the shape of the article with the help of the rotatable fastening device.

Although the present disclosure has been described in considerable detail with reference to certain embodiments thereof, the present disclosure should not be limited thereto. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

The invention claimed is:

1. A fixing frame which is for clamping an article, comprising:
   a frame body detachably positioned on at least two sides of the article, comprising:
      a rail; and
      a clasping member slidably positioned on the rail, the clasping member being movable between a securing position and a releasing position, the article being allowed to be released when the clasping member being at the releasing position, the article being firmly connected to the frame body when the clasping member being at the securing position;
   a lace limitedly threaded between the frame body and the clasping member; and
   a rotatable fastening device coupled to the lace, the rotatable fastening device comprising a knob and a housing, wherein the lace is wound into the housing by rotating the knob along a fastening direction;
   wherein the clasping member is moved from the releasing position to the securing position along the rail by rotating the rotatable fastening device along the fastening direction.

2. The fixing frame of claim 1, wherein the frame body further comprises:
   a plurality of through holes provided for the lace to pass through the frame body;
   wherein the clasping member comprises a guiding passage for the lace to pass through the clasping member.

3. The fixing frame of claim 1, wherein the lace is detachably coupled to the rotatable fastening device.

4. The fixing frame of claim 1, wherein the lace is incrementally released or fully released by rotating the rotatable fastening device along a loosening direction.

5. The fixing direction of claim 1, wherein the rotatable fastening device comprises:
a releasing mechanism;
wherein the lace is released by operating the releasing mechanism.

6. A fixing frame for clamping an article, the fixing frame comprising:
a frame body comprising a pair of frame body sections which are unattached to each other, wherein each of the frame body sections has a first surface and a second surface opposite to the first surface, and comprises a rail extending outwardly from the first surface, the rail forming a space therein;
a pair of clasping members connected respectively to the frame body sections, wherein each of the clasping members is received partially in the space of the rail of the corresponding frame body section;
a rotatable fastening device; and
a lace threaded through the clasping members, the frame body sections, and the rotatable fastening device;
wherein a length of the lace is increased or reduced by rotating the rotatable fastening device to move the clasping members to a releasing position or a securing position.

7. The fixing frame of claim 6, wherein each of the clasping members is formed with a pair of grooves on opposite surfaces thereof, and each of the rails comprises a pair of ribs opposing each other and enclosing a part of the space, wherein the ribs are received respectively in the grooves of the corresponding clasping member.

8. The fixing frame of claim 7, wherein the clasping members are slidably connected respectively to the frame body sections by the interaction between the ribs and the grooves, each of the frame body sections further comprises an abutting member which extends outwardly from the first surface thereof, and each of the clasping members comprises a lip that protrudes outwardly from a surface thereof, wherein when the length of the lace is reduced, each of the clasping members slides on the corresponding frame body section to reduce a distance between the lip of said each of the clasping members and the abutting member of the corresponding frame body section to thereby secure a portion of the article between said lip and said abutting member.

9. The fixing frame of claim 8, wherein the abutting member of each of the frame body sections is adjacent to and spatially separated from the rail of said each of the frame body sections.

10. The fixing frame of claim 6, wherein the clasping members are slidably connected respectively to the frame body sections, each of the frame body sections further comprises an abutting member which extends outwardly from the first surface thereof, and each of the clasping members comprises a lip that protrudes outwardly from a surface thereof, wherein when the length of the lace is reduced, each of the clasping members slides on the corresponding frame body section to reduce a distance between the lip of said each of the clasping members and the abutting member of the corresponding frame body section to thereby secure a portion of the article between said lip and said abutting member.

11. The fixing frame of claim 10, wherein the abutting member of each of the frame body sections is adjacent to and spatially separated from the rail of said each of the frame body sections.

12. A fixing frame which is for clamping an article, comprising:
a frame body, comprising:
a rail; and
a clasping member slidably positioned on the rail, the clasping member being movable between a securing position and a releasing position, the article being allowed to be released when the clasping member being at the releasing position, the article being firmly connected to the frame body when the clasping member being at the securing position;
a lace limitedly threaded through the clasping member; and
a rotatable fastening device coupled to the lace, the rotatable fastening device comprising a knob and a housing, wherein the lace is wound into the housing by rotating the knob along a fastening direction;
wherein the clasping member is moved from the releasing position to the securing position along the rail by rotating the rotatable fastening device along the fastening direction.

13. The fixing frame of claim 12, wherein the frame body further comprises:
a plurality of through holes provided for the lace to pass through the frame body;
wherein the clasping member comprises a guiding passage for the lace to pass through the clasping member.

14. The fixing frame of claim 12, wherein the lace is detachably coupled to the rotatable fastening device.

15. The fixing frame of claim 12, wherein the lace is incrementally released or fully released by rotating the rotatable fastening device along a loosening direction.

16. The fixing direction of claim 12, wherein the rotatable fastening device comprises:
a releasing mechanism;
wherein the lace is released by operating the releasing mechanism.

* * * * *